United States Patent
Aulbaugh et al.

[11] Patent Number: 6,143,136
[45] Date of Patent: Nov. 7, 2000

[54] METHOD AND APPARATUS FOR PHYSICAL AND CHEMICAL SEPARATION AND REACTION

[75] Inventors: Randy Aulbaugh, Irving; Gregory G. Hawk, Coppell, both of Tex.

[73] Assignee: Sepradyne Corporation, Denton, Tex.

[21] Appl. No.: 08/884,590

[22] Filed: Jun. 27, 1997

Related U.S. Application Data

[60] Division of application No. 08/785,343, Jan. 17, 1997, Pat. No. 5,746,987, which is a continuation-in-part of application No. 08/544,602, Oct. 18, 1995, Pat. No. 5,628,969.

[51] Int. Cl.⁷ .............................. C10B 51/00; B01D 3/34; A62D 3/00
[52] U.S. Cl. .................. 201/25; 201/35; 203/49; 203/95; 588/234
[58] Field of Search ............................ 588/234; 201/25, 201/35; 203/49, 95; 422/190, 258, 259, 268; 202/238

[56] References Cited

U.S. PATENT DOCUMENTS

| | | | |
|---|---|---|---|
| 4,084,521 | 4/1978 | Herbold et al. | 110/242 |
| 4,557,204 | 12/1985 | Faehnle | 110/346 |
| 4,667,609 | 5/1987 | Hardison et al. | 110/236 |
| 5,200,033 | 4/1993 | Weizman | 159/47.1 |
| 5,253,597 | 10/1993 | Swanstrom et al. | 110/346 |
| 5,300,137 | 4/1994 | Weyand et al. | 75/670 |
| 5,330,623 | 7/1994 | Holland | 201/19 |
| 5,517,004 | 5/1996 | Blonk | 219/652 |

*Primary Examiner*—Nina Bhat
*Attorney, Agent, or Firm*—Locke Liddell & Sapp LLP

[57] ABSTRACT

A method and apparatus for separating volatile from non-volatile substances, separation of volatile substances, one from the other, and for performing various chemical reactions. In particular, an apparatus which performs these functions utilizing a combination of above ambient temperatures and above one inch of mercury vacuum within a rotating vessel. The apparatus uses a conventional rotary vacuum seal. The apparatus, however, operates well above the maximum operating temperature of the conventional rotary vacuum seal by isolating and cooling the conventional rotary vacuum seal.

25 Claims, 3 Drawing Sheets

METHOD AND APPARATUS FOR PHYSICAL AND CHEMICAL SEPARATION AND REACTION

This application is a divisional application of Ser. No. 08/785,343 filed Jan. 17, 1997 now U.S. Pat. No. 5,746,987 which is a continuation-in-part of Ser. No. 08/544,602 filed Oct. 18, 1995 now U.S. Pat. No. 5,628,969.

BACKGROUND OF THE INVENTION

The present invention relates to a method and apparatus for use in the separation of volatile from non-volatile substances, separation of volatile substances, one from another, and for performing various chemical reactions. In particular, the invention relates to an apparatus to perform the aforementioned functions utilizing a combination of above-ambient temperatures and a vacuum in the range of ambient to zero pressure absolute within a rotating vessel. Because of the compactness allowed by the present invention, the apparatus can also be configured to operate in a self-contained mobile mode.

Various thermal treatment systems have been, and continue to be, used to separate volatile from non-volatile substances. For example, thermal desorption units are commonly used to remove substances such as mercury and volatile organics from soil and other solids. Examples of such prior art methods and apparatus are disclosed in U.S. Pat. Nos. 4,268,306; 5,183,499; 5,244,492; and 5,300,137. These prior art systems use heated rotating vessels under slight vacuums of less than 1 inch of mercury or heated non-rotating vessels operated at high vacuums of over 28 inches of mercury. The slight vacuum employed in rotating systems is to prevent leakage of environmentally-regulated substances out of the retort and off-gas treatment system, while the high vacuum in non-rotating systems serves to shorten process times. Although the technology is well known, there are several drawbacks and limitations which are overcome with the current invention.

First, in the prior art rotating systems, complex off-gas treatment equipment is required to remove contaminated particulates and regulated chemicals prior to discharge of the treated gases to the atmosphere. This complex off-gas treatment equipment is very large and expensive compared to the system's processing rate. Due to ever more stringent air emission regulations and the need to protect human health and the environment, these off-gas treatment systems continue to become even more sophisticated and costly. One of the primary reasons that the off-gas processing systems associated with prior art thermal units are so complex and expensive is because of the high volume of contaminated particulates and combustion, sweep, and/or leakage gases exhausted from the retort during operation.

To reduce the size and complexity of the off-gas treatment systems, indirectly fired retort vessels are often used. Heat is applied to the outside of the retort or applied with resistance heaters inside of the retort. These systems reduce the amount of particulates and eliminate the combustion gases exiting the retort. The prior art systems, however, do not entirely eliminate the carry out of particulates from the retort and still require a relatively large amount of sweep gas to move the vaporizing chemicals out of the retort. Therefore, even though an improvement, prior art indirectly fired retorts still require relatively large and expensive off-gas treatment systems.

In the present invention, however, the combination of a substantial vacuum ranging from 1 to 29+ inches of mercury and an internal filter substantially reduces carry out of particulates and substantially reduces the volume of sweep gases to move the vaporized substances out of the retort. The substantial vacuum of the present invention provides at least the following two benefits. One; it minimizes the suspension of fine particulates within the retort thereby minimizing the dust loading to the internal filter and two; it establishes a pressure gradient to assist in the diffusion of gases out of the retort. The amount of particulates and sweep gases exhausted from the retort is thereby reduced to the lowest practical level achievable. The dramatic reduction in off-gas treatment equipment size, complexity and cost is a significant improvement over prior-art technology.

Additionally, there are many cases in which one or more of the components of the matrix and/or the substances to be separated are thermally sensitive. That is, one or more of the substances break down to unwanted substances and/or the structure of one or more matrix components are altered in a way that adversely affects subsequent treatment or reuse. Prior art systems employing heat and vacuum can be used for these situations. The use of vacuum lowers the boiling point of substances and, depending upon the substances involved, may allow the separation of chemicals at below critical temperatures. However, prior art systems that use an above-ambient temperature and substantial vacuum do not rotate and are, therefore, small batch systems requiring long process times. Prior art systems do not use rotation in combination with high temperature and substantial vacuum because of difficulties with sealing a hot rotating vessel under those conditions. Inadequate seals allow uncontrolled amounts of air to flow into the retort resulting in carry out ot particulates and adding to the off-gas treatment requirements. To overcome the low processing rates of the prior art systems, the present invention employs a heated rotating vessel operating under a significant vacuum.

Rotation combined with flights and lifters mix the material thereby increasing the processing rate by improving heat transfer to the processed material, minimizing the path length the volatilized substances have to travel to exit the retort and minimizing the interference caused by collisions between the volatilized substances and particulates prior to exiting the retort. The present invention overcomes the problem of sealing a heated rotating vessel under substantial vacuum through the use of a uniquely designed rotating sleeve and externally mounted seal configuration that allows the seal to be easily cooled to below the maximum operating temperature of the seal.

Another problem associated with the prior art systems is that the common materials available for construction of the retort limit the maximum operating temperature of an indirectly fired unit. Therefore, substances with boiling points above these temperature limits can not be rapidly volatilized within these units but must be processed using expensive internally heated refractory lined units. In the present invention however, the use of a high vacuum within a rotating vessel lowers the boiling point of substances up to several hundred degrees Fahrenheit. This improvement allows the present invention to volatilize materials with high boiling points at a lower cost than has been possible using the prior art.

Due to the slight vacuums employed in present commercially available systems, there is a significant risk of releasing contaminants into the atmosphere due to a seal failure or an unexpected increase in the volatilization rate of the substances. Either event can cause a loss of vacuum that results in the release of contaminants to the atmosphere.

Finally, cleanup levels at contaminated sites are often dictated by the best available demonstrated technology.

Often, if acceptable cleanup levels can not be achieved from the standpoint of the protection of human health and the environment with on-site treatment, contaminated material must be excavated and hauled to a site to be treated and buried. The reason other technologies do not achieve an acceptably low residual level of contamination in the processed material is often because contaminants from deep within the material particulates are not removed. Over time, "clean" sites can be found to be contaminated because chemicals within processed material have migrated to the surface of the material particulates and are once again detected in analytical tests. The use of a high vacuum in the present invention provides the benefits of accelerating the overall separation process and maximizing the diffusion of volatile compounds from within the solid to the surface where they are rapidly vaporized and exhausted from the retort. The diffusion is maximized by the increased pressure gradient between the center of a particle and the surface of the particle. The contaminant within the particle vaporizes producing a high relative pressure inside the particle compared to the very low pressure at the surface of the particle. The present invention therefore accomplishes the goal of producing the lowest residual contamination levels achievable by efficiently removing contaminants from deep within the solid matrix.

Accordingly it is an object of this invention to provide a thermal processing apparatus that promotes the efficient separation of volatile and nonvolatile substances.

It is another object of this invention to provide a thermal processing apparatus that promotes various chemical reactions through the use of above-ambient temperature while maintaining a vacuum during rotation.

It is still another object of this invention to provide a thermal processing apparatus that promotes the efficient separation of volatile substances one from another.

It is a further object of this invention to provide a thermal processing apparatus that reduces off-gas treatment requirements while producing low residual contamination levels within the processed material.

It is a further object of this invention to provide a thermal processing apparatus that has a high batch-processing throughput while being capable of mobile operation.

These and other objects of the invention will be obvious and will appear hereinafter.

SUMMARY

The aforementioned and other objects are achieved by the invention which provides a method and apparatus for the separation of one or more substances from a material. The separation of one or more substances from the material can be volatile from nonvolatile or both volatile, separated one from the other. To accomplish this, the material is placed within a retort where heat is applied to the material thus making an internal temperature within the retort greater than ambient temperature. The retort is then rotated to distribute the heat substantially uniformly throughout the material while also decreasing processing times. A vacuum is applied to the retort to reduce the boiling point of the one or more substances such that the one or more substances vaporize more rapidly, thus separating the one or more substances from the material. As necessary, the vacuum can also be applied to reduce the boiling point of the one or more substances to below the maximum operating temperature of the retort and substantially increase the volatilization rate of one or more substances with boiling points still in excess of the maximum operating temperature of the retort.

Further, the invention is adapted to perform various chemical reactions by providing an apparatus, capable of being configured for mobile operation, that combines an above-ambient temperature and a vacuum ranging from ambient to zero pressure absolute in a rotating vessel. This apparatus reduces particulate and sweep gases to negligible amounts and thus, drastically reduces the need for the large and expensive off-gas processing systems found in the prior art. To maintain the vacuum at above-ambient temperature within a rotating retort, a rotary seal is used that is cooled to a temperature within the operating range of the rotary seal. Optionally, an internal filter can also be used to reduce an amount of particulates escaping from the retort.

The present invention combines the vacuum of between ambient and zero pressure absolute with an externally or internally heated rotating retort. Preferably, the vacuum is on the order of approximately twenty-nine inches of mercury and the internal temperature of the retort is well above the operating temperature of the rotary seal. To ensure that the vacuum is maintained, by prohibiting uncontrolled air leakage around the rotary seal, the rotary seal is cooled to below its maximum operating temperature.

The rotary seal prevents uncontrolled air leakage into the retort and produces an apparatus that substantially reduces carry out of particulates and minimizes the introduction of unwanted gases into the retort and, thus, into the off-gas treatment system. In addition, the vacuum of the present invention lowers the boiling point of many volatile compounds so that it efficiently processes substances that would normally be untreatable with current prior art indirectly fired thermal desorption units.

The particulate carry out is substantially reduced by a combination of a substantial vacuum, low sweep-gas volumes and an internal filter with or without a conventional blow-back system to prevent clogging. Optionally, the filter can be mounted outside the retort to facilitate maintenance, or it can be eliminated depending upon the material within the retort. Other particulate removal systems can be used. This combination also maximizes the processing rate. The vacuum accelerates volatilization rates of substances within materials, such as soil particles by creating a pressure gradient between the center and surface of the particles. The contaminants, thus, diffuse faster out of the interior of the contaminated substances.

In further aspects, the invention provides methods in accordance with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of sealed rotating devices and may be embodied in several different forms, it is advantageously employed in connection with a chemical reaction and separation apparatus. Though this is the form of the preferred embodiment and will be described as such, this embodiment should be considered illustrative and not restrictive.

Figure 1:
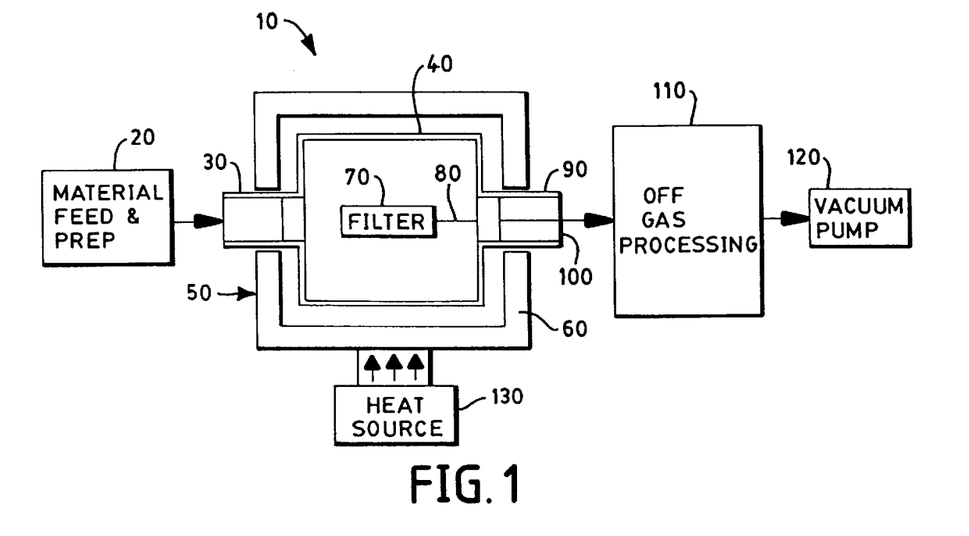
FIG. 1 is a schematic diagram illustrating one preferred embodiment of the apparatus of the present invention.

Turning now to FIG. 1, therein is disclosed an overall apparatus 10 of the present invention. A material 20 to be treated may use any suitable feed mechanism for its introduction into a retort 40. If necessary, the material 20 may be prepared using any number of conventional methods, such as crushing, sizing, screening, the addition of chemicals and/or other additives or shredding such that the material 20 is prepared and reduced to a size suitable of being fed through a first sleeve 30 of the apparatus 10 and being processed. As the material 20 is fed through the first sleeve 30, the material 20 is moved into the retort 40, which is a rotary vacuum thermal treatment vessel. The material 20 may be introduced into the retort 40 through the first sleeve 30 by any suitable mechanism including an auger, pump or any other conveyance method. For example, to load larger materials 20, such as a metal pipe, the normal feed device can be replaced with a load port that allows the placement of larger pieces of material 20 into the retort. The material 20 can also be stacked in the retort 40. For material which has been size reduced, the material is conveyed and leveled out within the retort 40 by the combination of rotation and flights and lifters, the flights and lifters being discussed later herein.

Note that an insulated firebox 50 surrounds the retort 40. The firebox 50 may be constructed ol any suitable material capable of supporting the insulation. In one embodiment, there is blanket insulating material 60 between the firebox 50 and the wall of the retort 40. The retort 40 may be constructed of any material capable of withstanding high temperature and vacuum. Preferably the retort 40 is constructed of materials that can withstand temperatures of 1100 degrees Celsius and vacuums of in excess of 29 inches of mercury.

Depending upon the material 20 that is to be placed in the retort 40, an internal tilter 70 may be used in connection with the retort 40 to substantially reduce particulates from entering an off-gas treatment system 110. If the material 20 is of a type that does not produce excessive dust then the internal filter 70 may not be necessary. One example of such a material is a liquid. Further, one skilled in the art will understand and that if a filter or other appropriate particulate removal systems is to be used, it can be mounted internally or externally without detriment to the invention. The internal filter 70, therefore, provides an optional extra layer of protection to substantially reduce particulates from entering the off-gas treatment system 110.

The filter 70 in the present embodiment is in the form of one or more sintered metal cylinders fitted with or without a conventional blow-back system (not shown) located inside the retort 40.

In operation, the volatilized materials pass through a conduit 80 and exit the retort 40 through sleeve 90. Sleeve 90 terminates at seal 100. The seal 100 is stationary with respect to the sleeve 90 and the conduit 80 and rotates relative to external non-rotating pipe (shown in FIG. 2). Once exited from the retort 40, the volatilized material is directed to any of a number of suitable off-gas treatment systems 110 for further processing or discharge to the atmosphere. A vacuum pump 120 is used to maintain a suitable vacuum within the retort 40 while in use. Off-gas processing can be performed at ambient pressure or vacuum, depending on vacuum pump placement. In the preferred embodiment, however, the off-gas treatment system 110 is under vacuum so that potential release of contaminants to the atmosphere is minimized. By placing the off-gas treatment system 110 under vacuum, a small leakage in the off-gas treatment system 110 results in an influx of air into the off-gas treatment system 110. In contrast, if the off-gas treatment system 1 10 were not under vacuum, that same leak could result in an escape of system gases.

In operation, heat is applied to the material 20 inside the retort 40. As previously described, the heat assists in the volatilization of the material 20. In the preferred embodiment, the heat is applied by a heat source 130 indirectly to the retort 40 within the firebox 50 and insulation material 60. The heat source 130 can be any conventional type heat source and can use any conventional fuel that will produce the proper temperatures necessary for the transfer of heat into the retort 40. For example, the heat source 130 may be from burning fossil fuels, resistance heaters, infrared heaters and microwave heaters or any of a number of conventional means.

Numerous other heating structures can also be used, such as resistance, infrared or microwave heaters, inter alia. Depending on the choice of heating structures, the heat is applied directly to the material 20, as is the case with radiant heat or conductive elements, or indirectly as previously described. For direct heating the heating structure is mounted inside the retort 40 with the retort unlined or lined on the inside with refractory material or insulated on the outside with material capable of withstanding high temperatures. One skilled in the art will realize, that heating can be accomplished using radiation, conduction, and/or convection either directly and/or indirectly with the heating systems mounted internally and/or externally as long as sufficient heat is transferred into the retort 40, and thus the material 20.

However, while direct heating with hot gases at or near ambient pressure transfers heat more efficiently than indirect heating at reduced pressure, it also increases the volume of off gases as well as particulate carry out. Therefore, the invention preferably uses direct and/or indirect heating by conduction or radiation without introduction of large volumes of hot gases. An example of a heating system that introduces small volumes of hot gases without introducing the aforementioned problems is direct heating using very hot gas or plasma. The temperature range for heating the gas is from 1000 degrees Centigrade up to plasma range.

In the preferred embodiment, regardless of the type or directivity of the heating, the vacuum pump 120 is utilized to establish and maintain a vacuum within the retort 40 within a range of ambient to zero pressure absolute. In the preferred embodiment, the vacuum is in a range of approximately 1 to 29 inches of mercury during the operation of the apparatus 10.

After treatment in the apparatus 10, the volatilized and gaseous materials can go through many types of off-gas treatment systems 110 including conventional separators gas/gas phase reactors, condensers, scrubbers, absorption/adsorption beds, catalytic reactors and direct release to the atmosphere.

Figure 2:
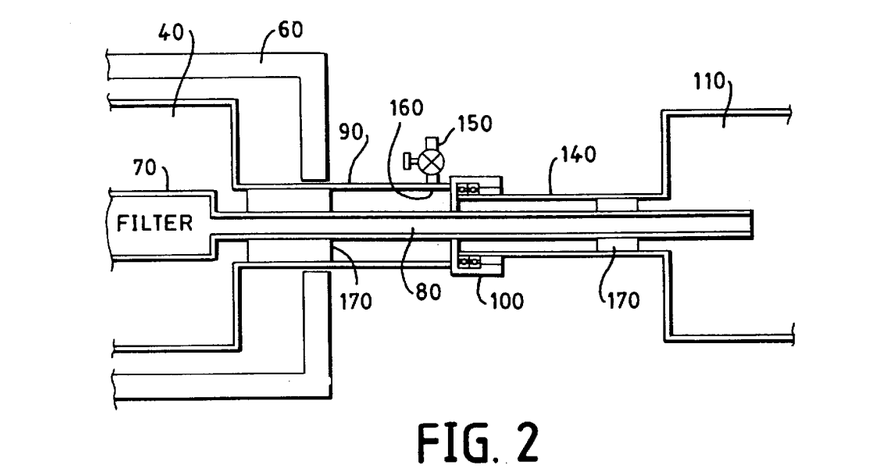
FIG. 2 is a longitudinal cross-section of one embodiment of the seal assembly of the apparatus of the present invention.

Turning now to FIG. 2. therein is described one preferred embodiment of first sleeve 30 utilized in connection with the present invention. In this embodiment, an end cap 5 seals the load/unload aperture during processing. A thermal plug 175 then thermally isolates first sleeve 30 and end cap 5 from the retort 40. Flow control device 150 meters in purge gas 160 which prevents condensation and particulate infiltration into the volume of sleeve 90. Connecting rod 35 maintains the position of thermal plug 175 relative to end cap 5.

Substantially opposed to the first sleeve 30 is the sleeve 90 utilized in connection with the present invention. Note that the vaporized and gaseous materials pass through the conduit 80 as it exits out of the retort 40 to the off-gas treatment system 110.

The vaporized and gaseous materials flow through the filter 70, if present, into the conduit 80. The conduit 80 also attaches to a rotary vacuum seal 100 and rotates relative to external non-rotating pipe 140.

Also shown in FIG. 2 is a purge or process gas flow control device 150 on sleeve 90. The purge gas 160, which may be air, performs two functions: first, it helps to maintain the temperature of the outer sleeve 90 near that of ambient air. Second, it helps to prevent the entry of process off-gases, which in turn prevents contaminant condensate from building up inside the sleeve 90. In addition, the very slight pressure gradient caused by the purge gas helps to prevent particulates and condensables from entering the sleeve 90.

The purge gas 160 may be introduced into the retort 40 to help sweep gases out of the retort 40 and/or to facilitate various chemical reactions. Using the purge gas 160 to facilitate chemical reactions is accomplished by substituting an oxidizing, reducing or inert gas as the purge gas 160. By doing so, the purge gas 160 can react with one or more substances to create chemicals of different volatility thereby facilitating separation from one another and the material. Alternatively, a separate gas can be introduced through the first sleeve 30 such that the gas contacts material 20 before flowing into the conduit 80. In this alternative method, the sweep gas is used to facilitate the chemical reactions while the purge gas 160 is usually air used for cooling the sleeve 90. One skilled in the art will realize however, that the purge gas 160 can be any of various gases for facilitating the chemical reactions or can be a separate gas other than air to further facilitate cooling of the sleeve 90.

This design also reduces the amount of purge gas required to assist the movement of volatilized and gaseous substances out of the retort 40. In addition, the high vacuum increases the rate of diffusion of the gases and vapors from an area of higher concentration within the retort 40 to an area of lower concentration in the off-gas treatment system 110.

The use of the seal 100 allows the rotating retort 40 to be properly sealed at high temperatures, even though the retort 40 dimensions are changing due to thermal expansion. Due to the ability of the purge gas and rotating tube within a tube system of the present invention to keep the seal 100 retort 40 interface cool, commercially available elastomer seals can be utilized. One of the disadvantages of the prior art is that most conventional seals can only withstand temperatures up to approximately 300 to 400 degrees Fahrenheit, which is far less than the operating temperatures generated within the retort 40. While high temperature seals are currently being developed, they are far more expensive than those used in the present invention. One skilled in the art will realize that the seal 100 depicted is an internal-type seal and that alternative configurations with a seal mounted external to sleeve 90, inter alia, can also be used.

In addition, note that there are thermal plugs 170 that also assist in maintaining the temperature differential between the retort 40 and sleeve 90 and between the sleeve 90 and the off-gas treatment system 110.

Figure 3:
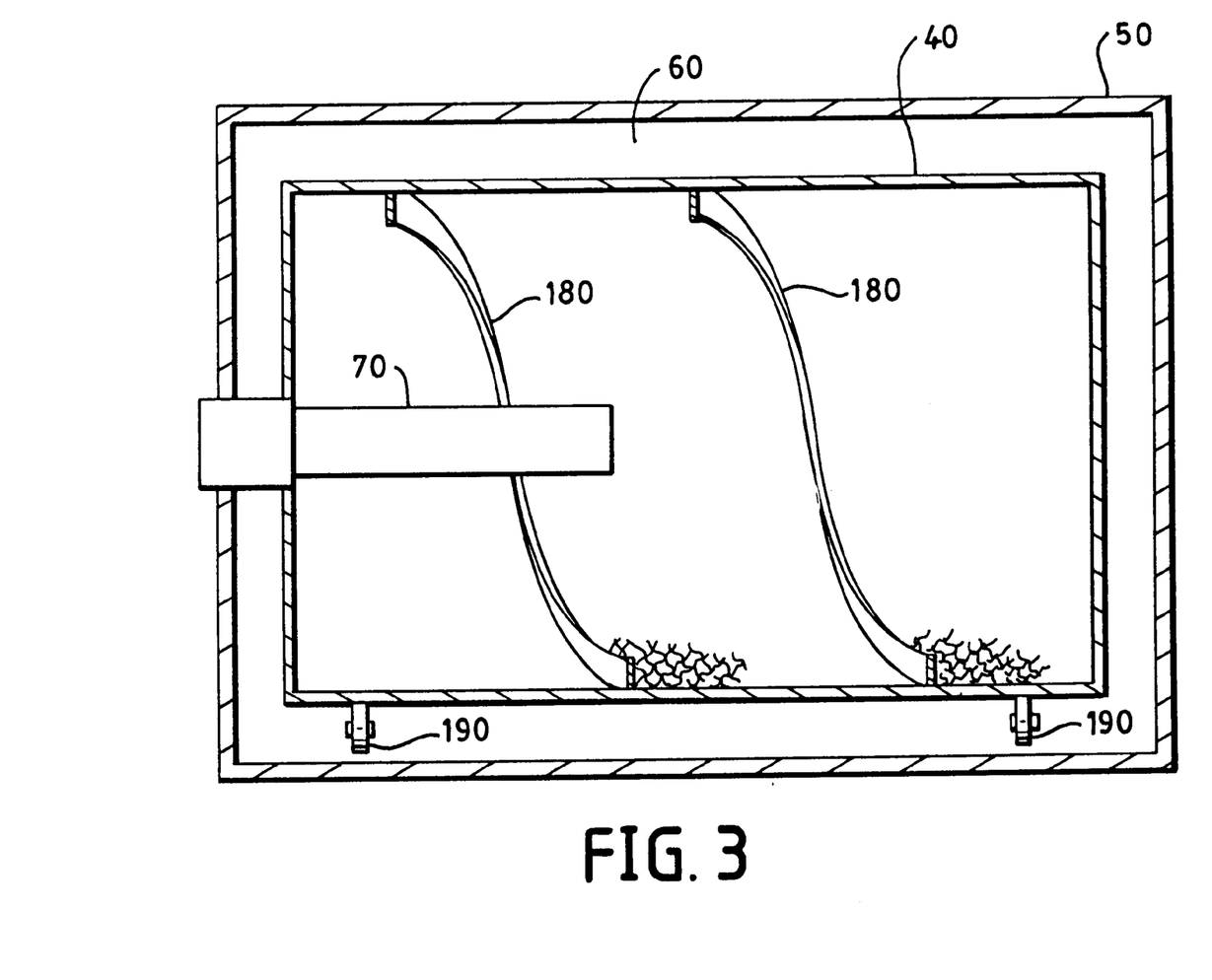
FIG. 3 is a longitudinal cross-section of one preferred embodiment of the retort of the present invention.

Now turning to FIG. 3, in one embodiment of the apparatus 10, the retort 40 is a cylindrical vessel that has internal flights, or spirals, and lifters 180. Support rollers 190 are also used in connection with the retort 40 so that it is easily rotatable within the firebox 50. Once a vacuum has been established by the vacuum pump 120, the retort 40 is set into rotation by a suitable drive motor and gearing system (not shown). The rotation of the retort 40 not only enhances heat transfer in the material 20 but also has the benefit of distributing heat around the retort 40 itself. Thermal expansion is substantially uniform about the circumference of the retort 40, thus decreasing fatigue and cracking of the retort 40 which is a significant problem with non-rotating retorts.

The placement of the flights and lifters 180 along the interior wall of the retort 40 acts to enhance the heat transfer from the retort 40 to the material 20 to be processed. The rotation of the retort 40 and the use of the flights and lifters 180 also enhances the surface area of the material 20 exposed to the vacuum by inducing a cascading and/or rolling of the material thereby minimizing the path length required for the vapors and gases to exit the retort 40 and also minimizing the interferences caused by interactions between vapor molecules and particulates during the movement of the vapor out of the retort.

The use of rotation and the flights and lifters 180 also allow filling of the retort 40 to a greater bed depth than traditional retorts, thereby increasing throughput. The fast removal of the volatilized substances from the retort 40 minimizes the degree of thermal decomposition occurring within the retort 40, resulting in a more defined off-gas stream and simpler design of the off-gas treatment system 110.

Chains, steel balls or other devices can be used inside the retort 40 to further reduce particle size during processing. The interior of the retort 40 preferably contains a sintered metal filter 70 capable of continuous service under the conditions created within the retort 40. All gases exiting the retort 40 pass through the filter 70 which acts to prevent particulates from entering the off-gas treatment system 110. Typically, the filter 70 is mounted coaxially or offset in the upper half of the retort 40 and may or may not rotate within the retort, though as previously stated, the filter 70 may be mounted externally or eliminated depending on material characteristics.

Note that the apparatus 10 may be placed on trailers or railcars or unloaded and assembled at any site where material is to be processed. Although the process as described in this patent is a batch process, it can also be a continuous process. In addition, chemical reactions can be performed by using the apparatus 10 to create the necessary thermal and atmospheric conditions within the retort 40.

Moreover, the apparatus 1 0 of the present invention is particularly useful for volume reducing radioactive materials through the use of the retort 40 for removing free water and waters of hydration, separating non-radioactive volatile substances from radioactive non-volatile substances such as organic ion exchange resins from radioactive isotopes and decomposing non-radioactive solids into one or more gases such as converting non-radioactive calcium carbonate contaminated with radioactive cesium into calcium oxide and carbon dioxide.

Figure 4:
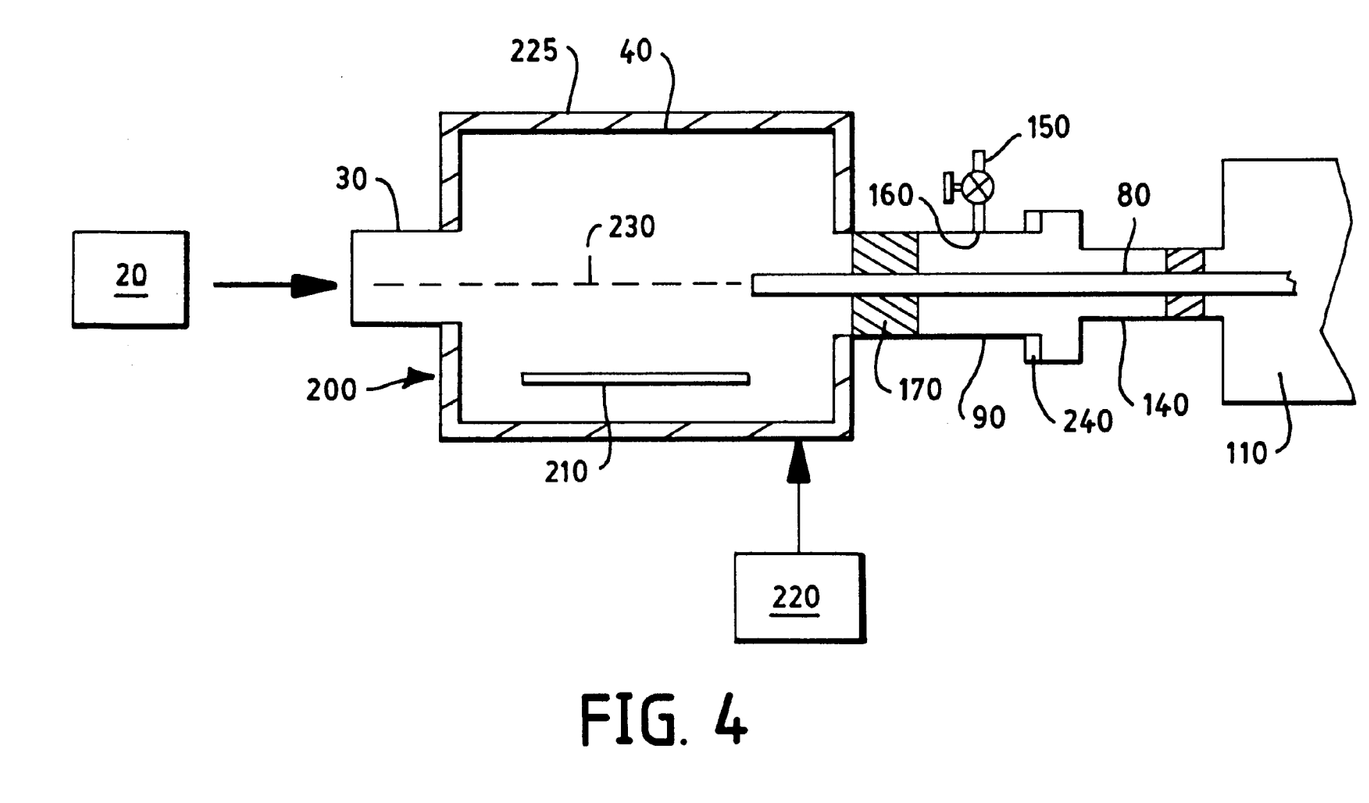
FIG. 4 is a longitudinal cross-section illustrating a second preferred embodiment of the apparatus of the present invention.

FIG. 4 shows an alternative embodiment of the invention where a physical and/or chemical processing and reaction apparatus 200 is shown receiving material 20 for processing. The material 20 can be any of various materials that include substances that are desired to be separated. An example of such a material is soil that is contaminated with mercury, or other substances. Another example is discarded fluorescent light bulbs that contain mercury. In either case, the invention is used to remove the mercury such that the soil may be reused or the glass and phosphorescent powder can be recycled, respectively.

Moreover, the invention specifically targets substances and is so efficient that the substance itself can often be recycled. For example, if mercury is the substance being removed from soil, the soil is not only reusable but the mercury itself may also be recycled. In some cases, a substance is separated and captured in a form clean enough for reuse.

Further, since individual substances may be targeted by their individual boiling points, each substance may be individually volatilized. Thus, in a material in which multiple substances are to be separated, each substance may be selectively segregated. One skilled in the art will realize that selection by boiling point as described ignores volatilization prior to reaching the boiling point, as occurs in real physical systems. Therefore, targeting may produce low concentrations of other substances depending upon other components in the material 20. For example, water has a boiling point substantially less than mercury. However, when you dry mercury contaminated soil, you will also volatilize some of the mercury. Then, once the soil is dry, you can volatilize off nearly pure mercury. Essentially, the invention applies Le Chatelier's Principle that if the equilibrium of a system is disturbed by a change in one or more of the determining factors, such as temperature, pressure or concentration, the system tends to adjust itself to a new equilibrium by attempting to counteract any effects of the change. Thus, the substance is volatilized even though a temperature of the material 20 has not reached a boiling point of the substance because the concentration of the volatilized substance, i.e. the product of the reaction, in the retort is always kept very low by constantly removing the substance from the retort. For example, where Hg(l)—mercury in liquid form, Hg(g)—mercury in gaseous form.

Therefore, by maintaining a low concentration of Hg(g) within the retort 40, the reaction is driven to produce more Hg(g).

In addition, substances can be chemically converted within the retort 40 to alter their boiling points. For example, if an ore of a metal such as gold is placed within the retort 40, a substance can be added that will combine with the gold forming a gold salt, such as gold chloride, which has a much lower boiling point than does metallic gold, thus volitalizing the gold more readily. Since this is not a hydrometallurgical process, it is amenable to use in dry locations while operating economically and in an environmentally friendly manner.

By employing additives to the material 20, the invention can selectively reduce the boiling points and increase the vaporization rate of only the target substances, thus the chemical processing and reaction apparatus 200 has an ability to remove compounds with boiling points higher than the operating temperature limit of the retort 40 itself.

The invention, however, is not restricted to use with particular substances nor is it restricted to use with solid materials. Slurries, sludges and even liquid mixtures can be readily treated. Use of the invention to separate miscible substances with different boiling points is essentially a form of vacuum distillation. Another contaminated material that is foreseen as being amenable to the herein described separation process is the removal of cyanide from pot liner waste generated from primary aluminum production. This pot liner waste is a carbon matrix containing soluble fluorides and various cyanide compounds. One skilled in the art will realize that these are only a few of numerous possible examples of how the inventive process and apparatus can be used for substance separation in hazardous-waste remediation, recycling, chemical processing and materials fabrication.

The material 20 is placed in the retort 40 through the first sleeve 30 as previously described. In contrast to the previous embodiment, a direct heater 210 is disposed within the retort 40 to heat the material 20. The choice of direct versus indirect heat will depend on the operating temperature needed to volatilize the target substances. For example, if exceptionally high temperatures are required, then direct heating with a refractory lined retort may be employed.

Optionally, but preferably, an insulation layer 225 surrounds the retort 40 to prevent the passage of heat out of the retort 40. Alternatively, a refractory layer could be placed on the inside of the retort 40 as is well known in the art.

The retort is then driven in a rotational motion about a central axis 230 of the retort 40. The retort is a vessel capable of withstanding continuous operation at high temperature and vacuum with an outlet tube for conveyance of gases out of the vessel. One skilled in the art will know that numerous vessels can be used in this invention. Rotation is achieved using a motor 220 which communicates the rotational motion via methods well known in the art. In the preferred embodiment, the motor 220 drives a chain (not shown) which is in mechanical contact with a sprocket on the retort. Other means of rotational communication such as gears, inter alia, or non-mechanical communication, such as magnetic induction, inter alia, can also be used.

As was previously described a vacuum is introduced into the retort by one or more vacuum pumps 120, as shown in FIG. 1. The vacuum can range from ambient to zero pressure absolute, but is preferably in the range of approximately 1 to 29 inches of mercury. A lower vacuum achieves a goal of preventing leakage of environmentally-regulated substances out of the retort 40 and an associated off-gas treatment system (not shown), while the high vacuum in addition to leakage prevention shortens process times. In the preferred embodiment, a high vacuum is utilized because a high vacuum has the aforementioned benefits but also minimizes the suspension of fine particulates within the retort thereby minimizing dust while also establishing a pressure gradient that assists in the diffusion of gases out of the retort 40.

A beneficial result of minimizing dust and preventing leakage as previously described is that the gases exhausted from the retort 40 are cleaner, i.e., reduced particulates and sweep gases, thus accommodating a reduction in off-gas treatment equipment. One skilled in the art will appreciate the usual bulk associated with such off-gas treatment equipment. Therefore, the reduction achieved by the invention provides a high throughput chemical processing and reaction apparatus that can be easily transportable. Mobility allows on-site decontamination that further reduces decontamination costs.

Another benefit of using a high vacuum is the ability to alter a boiling point of a substance. It is well known in the art that as pressure decreases, the boiling point of a substance correspondingly decreases. Since differing substances have differing degrees of thermal sensitivity, an ability to control the boiling point becomes beneficial. That is, if a substance to be removed from the material 20 can break down to unwanted substances and/or the structure of one or more matrix components can be altered in a way that adversely affects subsequent treatment or reuse, then lowering the boiling point of the substance using a high vacuum to less than the temperature of the thermal sensitivity maintains that state of the substance while achieving volatility. Further, by lowering temperatures necessary to volatilize the substances in the material 20, the temperatures within the retort 40 can be maintained at a level less than the maximum operating temperature of the retort 40.

In addition, the high vacuum increases the rate of diffusion of the gases and vapors from an area of higher concentration within the retort 40 to an area of lower concentration in the off-gas treatment system 110, thus evacuating the retort 40 while using minimal sweep gas.

Existing retorts employ only a slight vacuum to ensure that off gases are captured and contained within the system. Any slight leakage in the system results in the movement of air into the system. However, a slight vacuum provides a very small margin of safety. If the volatilization rate unexpectedly accelerates, which can very easily occur, particularly during drying of the material, the system can easily pressurize resulting in the increased potential of releasing contaminants to the atmosphere. To compensate, many systems must dry loads slowly to ensure complete control of the water volatilization rate.

One way the invention I0 can reduce the possibility of contaminant release is by employing a back-up vacuum pump (not shown) to maintain vacuum in the system in the event of either a seal failure or an unexpected acceleration in the volatilization rate of one or more substances. To provide an extra level of safety, the back-up vacuum pump engages and the heating of the retort stops when the system vacuum decreases to a preset level depending upon the material being processed. When the heat is turned off and the vacuum level in the retort begins to decrease, the volatilization rate of substances within the retort decreases and the entire process is quickly controlled to minimize the potential release of contaminants.

Even in the absence of a back-up vacuum pump however, significant safety levels are achieved by the invention 10. The invention 10 is self limiting in that as the vacuum level decreases, the boiling point of the substances in the material increase. Therefore, when heat and the vacuum level decrease, the volatilization rate of the substance quickly decreases. Typically, the vacuum pump can then very rapidly remove the excess gas from the retort and reestablish a safe vacuum level within the retort.

The aforementioned pressure and temperature control achieves volatilization of targeted substances within the material 20 that is exposed to these conditions. Therefore, processing time is decreased and substance removal efficiency is increased by exposing more of the material to these conditions. Rotating the retort 40 provides an agitation that distributes the heat throughout the material 20, thus expediting the heat transfer from the retort 40 to the material 20 to be processed. The rotation of the retort 40 and the use of the flights and lifters 180, as described in FIG. 3, also minimizes the path length required for the vapors and gases to exit the retort 40 and also minimizes the interferences caused by interactions between vapor molecules and particulates during the movement of the vapor out of the retort 40. In addition, the rotation of the retort 40 and the use of the flights and lifters 180, again as described in FIG. 3 enhances the surface area of the material 20 exposed to the vacuum by inducing a cascading and/or rolling of the material 20 thereby expediting heat transfer and thus volatilization.

Once volatilized, the vaporized and gaseous substances pass through a conduit 80 as the substances exit the retort 40 to the off-gas treatment system, (previously described and illustrated). The conduit 80 is substantially coaxial with a sleeve 90. The sleeve 90 is integral with the retort 40 and, in the preferred embodiment, the sleeve 90 is unitary with the retort 40. In either case though, the sleeve rotates with the retort 40. One skilled in the art will realize that this embodiment utilizes a rotating sleeve that is integral with the retort 40 and that numerous other combinations are possible, such as a stationary sleeve or a sleeve that is not integral with the retort.

In further contrast to the previous embodiments, the chemical processing and reaction apparatus 200 of this embodiment does not use an internal filter. Optionally, a filter can be used as previously described if the material 20 dictates the use of such a filter. However, if the material 20 by its nature has a low dust level or does not produce substantial particulates in its off gas then no filter is necessary. An example of such a material 20 is any material that does not produce fine particulates such as separating cutting oil from metal shavings or any liquid.

At a distal end of the sleeve 90 is a seal 240 mounted external to sleeve 90. As previously stated an internal seal can be substituted without detriment to the invention. The seal 240 is disposed between an external non-rotating pipe 140 and the sleeve 90. As the sleeve 90 rotates, the seal remains stationary with respect to the sleeve 90 and rotates with respect to the external non-rotating pipe 140 while maintaining vacuum containment.

The seal 240 provides vacuum containment within the retort 40 even while the retort 40 is rotating and is at high temperatures. The design of the chemical processing and reaction apparatus 200 ensures that a conventional rotary vacuum seal 240 can be used that is designed for use in lower-temperature environments, thus reducing system cost. The seal 240 is further not subjected to excessive thermal expansion of the retort 40 nor will the high temperatures within the retort 40 degrade the rotary vacuum seal 240, which as previously stated is not designed for a high-temperature environment.

Vacuum containment with such a rotary vacuum seal 240 is achieved by cooling the sleeve 90 to a temperature that is within a range acceptable to the rotary vacuum seal 240 while minimizing thermal expansion of the sleeve 90. To cool the sleeve 90, as well as to achieve other goals hereinafter described, purge gas 160 from outside the chemical processing and reaction apparatus 200 enters through a purge gas flow control device 150. The purge gas 160 has a temperature less than the operating temperature of the rotary vacuum seal 240 thus reducing the temperature of the rotary vacuum seal 240. The use of the purge gas 160, which is air in the preferred embodiment, assists in maintaining the temperature of the sleeve 90 near that of ambient air while also preventing the entry of process off gases, which in turn prevents substance condensate from building up inside the sleeve 90. In addition, the very slight pressure gradient caused by the purge gas helps to prevent particulates and condensables from entering the sleeve 90. Further, the sleeve 90 cools quickly in the preferred embodiment since heat radiates though the air more efficiently than heat is thermally conducted through the sleeve 90. This is also partially due to the cylindrical geometric design of the sleeve 90.

The purge gas 160 can be any of various gases depending upon the ambient temperatures or the desired result. For example, a cooling gas having a temperature well below that of ambient air can be used to significantly reduce the temperature of the sleeve. Another example is the use of reactive gases to facilitate chemical reactions.

In addition to the purge gas 160, alternative embodiments having greater heat dissipation requirements can utilize additional cooling structures. For example, external heat sinks can be attached to the sleeve 90 or a liquid jacket can be placed around the sleeve 90. In the later case, the liquid jacket substantially encloses the sleeve 90 and a liquid, water for example, is circulated through the liquid jacket. Heat in the liquid is then dissipated away from the sleeve in a manner analogous to a liquid-cooled internal combustion engine.

Thermal plugs 170 are used to assist in maintaining the temperature differential between the retort 40 and sleeve 90 and between the external non-rotating pipe 140 and the off-gas treatment system 110. The thermal plugs 170 in the preferred embodiment are insulative rings fabricated of a ceramic fiber. While in the preferred embodiment more than one thermal plug is utilized, it is possible to use only one thermal plug to practice an embodiment of the chemical processing and reaction apparatus. In the preferred embodiment, both the sleeve 90 and the conduit 80 are generally cylindrical and the thermal plugs 170 are annular bridging a gap between the sleeve 90 and the conduit 80. Also, in the preferred embodiment, the sleeve 90 is integral with the retort 40 and, therefore, the thermal plugs 170 divide an inner chamber of the retort 40 where the material 20 is disposed and the sleeve 90 where the seal 240 is disposed. In sleeve 30, the thermal plug 175 thermally isolates sleeve 30 and the end cap 5 from retort 40.

The thermal plugs 170 are secured to an inner surface of the sleeve 90 so as to establish a physical and thermal barrier between the sleeve 90 and the retort 40. The thermal plugs 170 then rotate with the sleeve 90 as the retort 40 rotates. An inner surface of the thermal plugs 170 is disposed proximally to the external non-rotating conduit 80 without forming a seal. Mechanical contact between the thermal plugs 170 and the conduit 80 can be established while still allowing gas flow across the thermal plugs 170 through gaps between the thermal plugs 170 and the conduit 80. Although, not necessary in the preferred embodiment to establish a conduction path, gas flow can also occur through the thermal plugs 170 in instances where the thermal plugs are fabricated from a suitable material.

The gas flow enables the process gas flow control device 150 to introduce the purge gas 160 which performs the aforementioned functions. When the process gas flow control device 150 is opened, either manually or using automatic process control mechanisms well known in the art, to introduce the purge gas 160, the atmosphere within the sleeve 90 and the external atmosphere attempt to reach equilibrium. Thus, the negative pressure, or vacuum, comprising the atmosphere within the sleeve 90 draws the purge gas 160 into the sleeve 90 at a rate proportional to that of the amount of negative pressure. This flow of purge gas 160 cools the sleeve 90 by absorbing heat from the sleeve 90 and the thermal plugs 170 as the purge gas 160 is drawn into the retort 40, thus assisting in maintaining the temperature of the sleeve 90 below a critical value for the seal 240, but preferably near that of ambient air.

The flow of purge gas 160 into the sleeve 90 decreases the vacuum within the sleeve 90. However, since there is only a small volume of purge gas entering the sleeve and the thermal plugs 170 have partially blocked flow of the purge gas 160 into the retort 40, the vacuum within the retort 40 is barely affected. Thus a very slight pressure differential between the sleeve 90 and the retort 40 is created producing a one way flow of purge gas from the sleeve 90 into the retort 40.

The pressure differential, or pressure gradient, prevents process off-gases and particulates from entering the sleeve 90 since there is a substantially constant gas flow from the sleeve 90 into the retort 40. This, in turn, prevents substance condensate from building up inside the sleeve 90.

Introduction of too much purge gas 160, however, can decrease system efficiency as the heater and vacuum pumps would be forced to compensate for decreases in vacuum and temperature within the retort 40. The cooling system collectively is, therefore, designed to reduce the amount of purge gas 160 required to assist in cooling the seal.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A method of separating one or more substances from a material disposed within a retort, the method comprising the steps of:
   applying heat to the material thus making an internal temperature within the retort greater than ambient temperature;
   rotating the retort to distribute the heat substantially uniformly throughout the material; and
   applying a vacuum of between about 2.25 mmHg and 735 mmHg to the retort to reduce a boiling point of the one or more substances such that the one or more substances volitilize thus separating the one or more substances from the material.

2. The method according to claim 1 wherein the retort has a rotary seal having a maximum operating temperature, the rotary seal containing the vacuum within the retort while the internal temperature within the retort is greater than the maximum operating temperature of the rotary seal.

3. The method according to claim 2 further comprising the step of cooling the rotary seal such that a temperature of the rotary seal is less than the maximum operating temperature of the rotary seal.

4. The method according to claim 3 wherein the step of cooling the rotary seal comprises providing external gases at a temperature less than the operating temperature of the rotary seal to cool the rotary seal.

5. The method according to claim 3 wherein the step of cooling the rotary vacuum seal comprises interposing at least one thermal plug between the retort and the rotary vacuum seal thus dividing the retort into an inner chamber and a sleeve, thereby substantially thermally isolating the rotary vacuum seal from the heat in the retort.

6. The method according to claim 5 wherein the step of cooling the rotary vacuum further comprises removing heat from an outside portion of the sleeve by exposing the outside portion of the sleeve with a cooling medium.

7. The method according to claim 6 wherein the cooling medium is at a cryogenic temperature.

8. The method according to claim 5 wherein the step of cooling further comprises providing a purge gas into the sleeve such that the purge gas is drawn into the inner chamber past the at least one thermal plug, thus cooling the rotary vacuum seal while reducing condensate and particulates from the sleeve.

9. The method according to claim 5 further comprising the step of providing a purge gas into the sleeve such that the purge gas is drawn into the inner chamber past the at least one thermal plug and then into the off-gas device under the vacuum, thus assisting the removal of the one or more substances.

10. The method according to claim 5 wherein the step of cooling the rotary seal further comprises providing a purge gas such that the purge gas is drawn into the inner chamber past the at least one thermal plug into the retort decreasing particulates and condensate from forming on the rotary seal.

11. The method according to claim 1 further comprising the step of targeting a specific substance from the one or more substances by selectively adjusting the vacuum and the internal temperature to volatilize the specific substance.

12. The method according to claim 1 further comprising the step of controlling the vacuum to adjust the boiling point of the one or more substances.

13. The method according to claim 1 further comprising the step of controlling the vacuum to minimize suspension of fine particulates within the retort.

14. The method according to claim 1 further comprising the step of controlling the vacuum to diffuse gases out of the retort.

15. The method according to claim 1 further comprising the step of evacuating gases from the retort by using the vacuum to create a gradient thus making gases from an area of higher concentration within the retort move to an area of lower concentration external to the retort.

16. The method according to claim 1 wherein the boiling point of the one or more substances is greater than a maximum operating temperature of the retort.

17. The method according to claim 1 further comprising the step of introducing a one or more additives to the material such that the additive chemically combines with the one or more substances to selectively alter the boiling point of the one or more substances.

18. A method of separating at least one substance as an off gas from a material disposed in a retort comprising the steps of:

supplying heat to the retort and the material such that the heat increases a temperature of the material sufficiently to vaporize the at least one substance;

rotating the retort such that the heat is dispersed within the retort and the material;

applying a vacuum of between about 2.25 mmHg and 735 mmHg to the retort, the vacuum thereby decreasing the boiling point of the at least one substance, thus volitalizing the at least one substance into the off-gas; and transferring the off gas out of the retort to an off-gas treatment system.

19. The method according to claim 18 further comprising the step of evaporating the at least one substance at a temperature less than the boiling point of the at least one substance.

20. The method according to claim 19 wherein the boiling point of the at least one substance is greater than a maximum operating temperature of a substance from which the retort is fabricated.

21. The method according to claim 19 further comprising the step of monitoring the vacuum in the retort and responding to a decrease in the vacuum to ensure that the at least one substance is not released into an environment.

22. A method of separating at least one substance from a material, the method comprising the steps of:

disposing the material in a retort;

applying heat to the material such that the heat increases a temperature of the material sufficiently to vaporize the at least one substance;

rotating the retort to decrease contact of the at least one substance with non-vaporized substances within the retort; and applying a vacuum of between 2.25 mmHg and 735 mmHg to the retort to facilitate exhausting the at least one substance out of the retort.

23. A method according to claim 22 further comprising the step of introducing a purge gas into the retort to assist exhausting the at least one substance out of the retort.

24. A method according to claim 22 wherein the vacuum reduces a boiling point of the at least one substance.

25. A method according to claim 22 wherein the retort includes a sleeve having a conduit for receiving the at least one substance the sleeve defining a chamber outside the conduit, the method further comprising the step of introducing a purge gas into the chamber such that the purge gas enters the retort and assists exhausting the at least one substance out of the retort.

* * * * *